US007325571B2

(12) United States Patent
Shimbori et al.

(10) Patent No.: US 7,325,571 B2
(45) Date of Patent: Feb. 5, 2008

(54) PRESSURE CONTAINER AND PRESSURE ACCUMULATING/BUFFER APPARATUS

(75) Inventors: Takeyoshi Shimbori, Yokohama (JP); Hiroshi Mizukami, Yokohama (JP); Koichiro Yamada, Yokohama (JP); Kyohei Inoue, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 0 days.

(21) Appl. No.: 11/207,060

(22) Filed: Aug. 18, 2005

(65) Prior Publication Data

US 2006/0037658 A1 Feb. 23, 2006

(30) Foreign Application Priority Data

Aug. 23, 2004 (JP) ............................ 2004-242565

(51) Int. Cl.
*F16L 55/04* (2006.01)

(52) U.S. Cl. .......................................... 138/30; 138/31

(58) Field of Classification Search .................. 138/30, 138/31
See application file for complete search history.

(56) References Cited

U.S. PATENT DOCUMENTS

| | | | | |
|---|---|---|---|---|
| 2,365,994 A * | 12/1944 | Ashton | | 138/31 |
| 2,444,833 A * | 7/1948 | Lampert | | 29/458 |
| 4,201,246 A * | 5/1980 | Wirth et al. | | 138/30 |
| 6,189,572 B1 * | 2/2001 | Ruffer et al. | | 138/30 |
| 6,286,552 B1 * | 9/2001 | Shimbori et al. | | 138/31 |
| 6,616,247 B2 * | 9/2003 | Mohr | | 303/87 |
| 6,622,755 B2 * | 9/2003 | Weber | | 138/30 |
| 6,666,529 B2 * | 12/2003 | Mohr | | 303/87 |
| 6,810,915 B2 * | 11/2004 | Umetsu et al. | | 138/31 |
| 6,892,765 B2 * | 5/2005 | Kamimura | | 138/30 |
| 2001/0037834 A1 | 11/2001 | Shimbori et al. | | |
| 2002/0180260 A1 * | 12/2002 | Mohr | | 303/87 |
| 2003/0038532 A1 * | 2/2003 | Mohr | | 303/1 |
| 2003/0116209 A1 * | 6/2003 | Umetsu et al. | | 138/31 |
| 2004/0003854 A1 * | 1/2004 | Kamimura | | 138/30 |
| 2005/0061379 A1 * | 3/2005 | Mori et al. | | 138/31 |

FOREIGN PATENT DOCUMENTS

| | | |
|---|---|---|
| EP | 1 391 614 A1 | 2/2004 |
| JP | 2001-116002 A | 4/2001 |
| JP | 2001-116003 A | 4/2001 |
| JP | 2003-120601 A | 4/2003 |
| WO | WO 03/064862 A1 | 8/2003 |

* cited by examiner

*Primary Examiner*—James Hook
(74) *Attorney, Agent, or Firm*—Frishauf, Holtz, Goodman & Chick, P.C.

(57) ABSTRACT

A pressure container has a steel pipe and an end plate that is formed with a joint portion by allowing its tapered surface to touch a tapered surface of an opening end of the steel pipe so as to block the opening end. The steel pipe has a flange portion which can be cut at the opening end of the steel pipe, and the joint portion is allowed to touch the flange portion. The flange portion is pressed against the opening end along an axial direction so as to touch the end plate, and while the end plate is being pressed against the steel pipe along the axial direction, an electric current is applied so that welding is carried out.

10 Claims, 4 Drawing Sheets

PRESSURE CONTAINER AND PRESSURE ACCUMULATING/BUFFER APPARATUS

CROSS-REFERENCE TO RELATED APPLICATIONS

This application is based upon and claims the benefit of priority from prior Japanese Patent Application No. 2004-242565, filed Aug. 23, 2004, the entire contents of which are incorporated herein by reference.

BACKGROUND OF THE INVENTION

1. Field of the Invention

The present invention relates to a pressure container and a pressure accumulating/buffer apparatus such as an accumulator which are used in an automobile and an industrial machine, and particularly relates to them where a welded portion between an end plate and a body portion is uniform.

2. Description of the Related Art

Accumulators (pressure accumulating/buffer apparatus) are used in hydraulic circuits and shock absorbers of hydraulic control apparatuses. In the accumulators, insides of pressure containers are generally divided into gas chambers and oil chambers by bellows, and pressure fluctuation in oil flowing into the oil chambers are buffered by the swell/shrink function of gas in the gas chambers due to expansion/shrinkage of the bellows (see Jpn. Pat. Appln. KOKAI Publication Nos. 2001-116002, 2001-116003 and 2003-120601). The accumulators are widely used as apparatuses, that effectively suppress pulsation generated in the coil flowing in the hydraulic circuits, for example, in automobiles and industrial machines.

In order to form pressure containers, it is necessary to joint a contour member to a cover body that closes the contour member with large strength. For example, resistance welding can be used in a pressure container with small thickness (2 mm or less), for example. FIGS. 5 and 6 are diagrams illustrating examples of such pressure containers. That is to say, a pressure container 10 has a steel pipe (contour member) 11, and an end plate 12 that covers an opening of the steel pipe 11. In FIG. 5, 13 and 14 designate electrodes.

In the case where the resistance welding is carried out, an outside surface of the steel pipe 11 is clamped by a double-split electrode 13, an outside surface of the end plate 12 is inserted into the steel pipe 11 from an end side so as to come in contact with its inner wall surface, and the electrode 14 is brought into contact with the outside surface of the steel pipe 11. Meanwhile, the electrode 14 is allowed to touch an upper surface of the end plate 12. While a load is applied to between the electrodes 13 and 14, an electric current is allowed to flow in the electrode 13, the steel pipe 11, the end plate 12 and the electrode 14, so that the inner wall surface of the steel pipe 11 and the outside surface of the end plate 12 are resistance-welded.

On the other hand, in a pressure container with large thickness (2 mm or more) shown in FIG. 7, the outer peripheral surface is jointed by Co2 welding, TIG welding and the like (see F in FIG. 7). FIG. 7 is a diagram illustrating one example of the accumulator. That is to say, an accumulator 20 has a cylindrical shell (contour member) 21, a first end plate (cover body) 22 which is fitted into one opening of the shell 21, and a second end plate (cover body) 23 which is fitted into the other opening. The first end plate 22 is formed with a through hole 22*a*, and the through hole 22*a* is blocked by a gas sealing stopper 22*b* airtightly. Further, the second end plate 23 is formed with a port 23*a*, and the port 23*a* is connected to the hydraulic circuit or the like so that oil freely goes in and out the port 23*a*.

On a lower surface of the first end plate 22 in FIG. 7, a disc-shaped bellows cap 25 is provided via a metallic bellows 24 so as to be slidably along an axial direction of the shell 21. 26 in FIG. 7 designates a guide attached to an outer peripheral portion of the bellows cap 25. The guide 26 has a function that assists the sliding of the bellows cap 25. A space formed by the first end plate 22, the metallic bellows 24 and the bellows cap 25 is a gas chamber G, and nitrogen gas or the like is sealed thereinto. Further, an oil chamber L is formed between the second end plate 23 and the bellows cap 25.

The above-mentioned method of jointing the pressure container has the following problem. That is to say, in the resistance welding, since the steel pipe is clamped by the double-split electrode, uniform contact and a strong clamping force cannot be obtained, and thus this method can be used only for thin steel pipes with thickness of up to about 2 mm. Further, in the case of the thick steel pipes, in order to obtain the strength of the welded portion by CO2 welding, TIG welding and the like of the outer peripheral surface, the steel pipes become large and heavy.

BRIEF SUMMARY OF THE INVENTION

It is an object of the present invention to form a joint portion having sufficient strength of a welded portion by obtaining large welding load and uniform contact in resistance welding even when a thick member is used and a large welding current is electrified.

The present invention provides a pressure container comprising: a cylindrical contour member; and a cover body which is formed with a joint portion by allowing its side wall portion to touch an inner wall portion of an opening end of the contour member and blocks the opening end, wherein the contour member has a flange portion which can be cut at the opening end, and the joint portion is allowed to touch the flange portion, the flange portion is pressed against the opening end along an axial direction so as to touch the cover body, and while the cover body is being pressed against the contour member along the axial direction, an electric current is applied so that welding is carried out.

The present invention also provides a pressure accumulating/buffer apparatus comprising: a pressure container; and an air chamber into which gas can be sealed and a liquid chamber into which a liquid can flow that are provided in the pressure container, wherein the pressure container has a cylindrical contour member and a cover body which is formed with a joint portion by allowing its side wall portion to touch an inner wall portion of an opening end of the contour member and blocks the opening end, the contour member has a flange portion which can be cut at the opening end, and the joint portion is allowed to touch the flange portion, the flange portion is pressed against the opening end along an axial direction so as to touch the cover body, and while the cover body is being pressed against the contour member along the axial direction, an electric current is applied so that welding is carried out.

According to the present invention, even when a thick member is used and a large welding current is electrified, large welding load and uniform contact is obtained in the resistance welding so that the joint portion having sufficient strength of the welded portion can be formed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
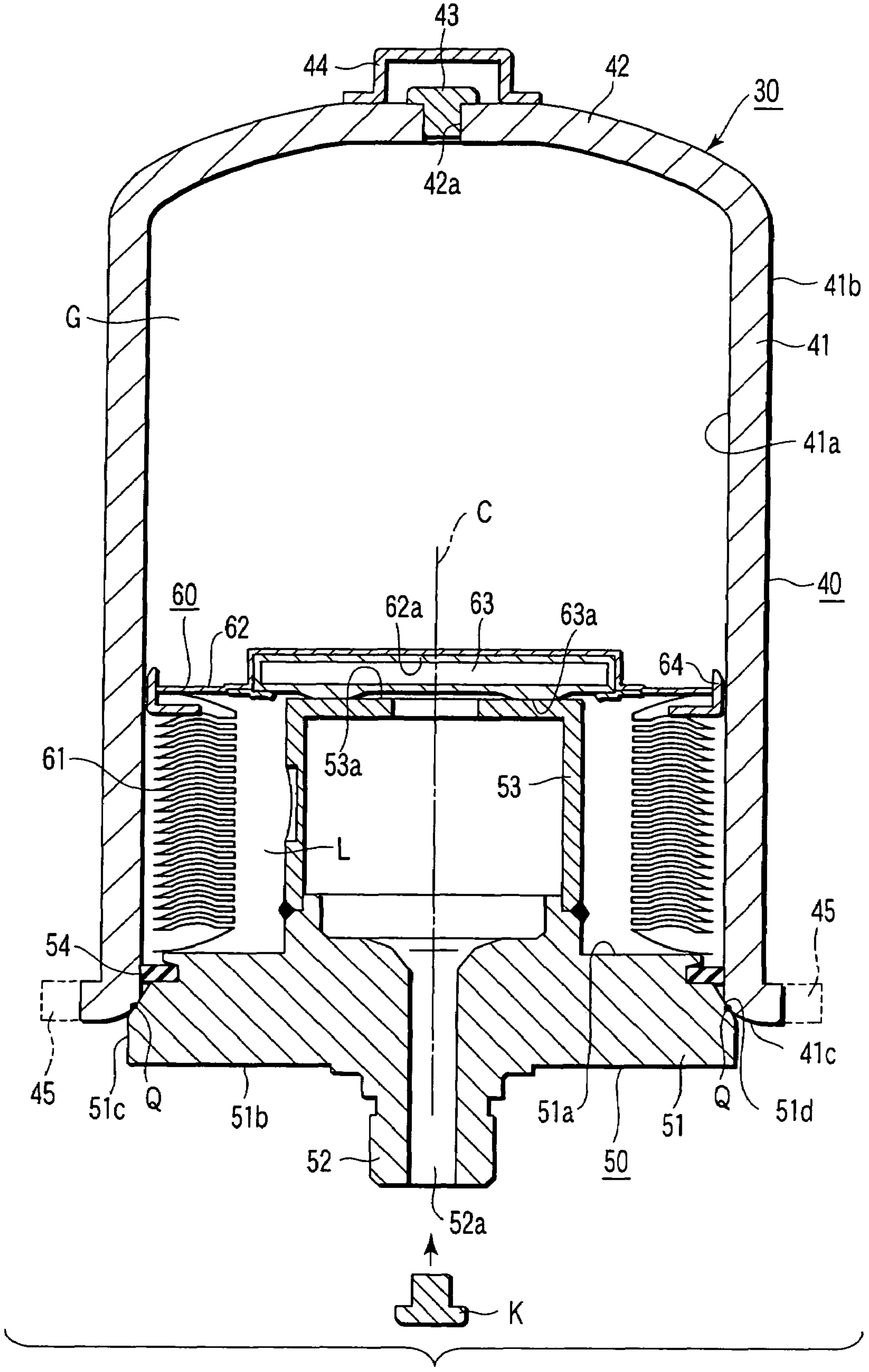
FIG. 1 is a longitudinal section illustrating an accumulator according to one embodiment of the present invention.
Figure 2:
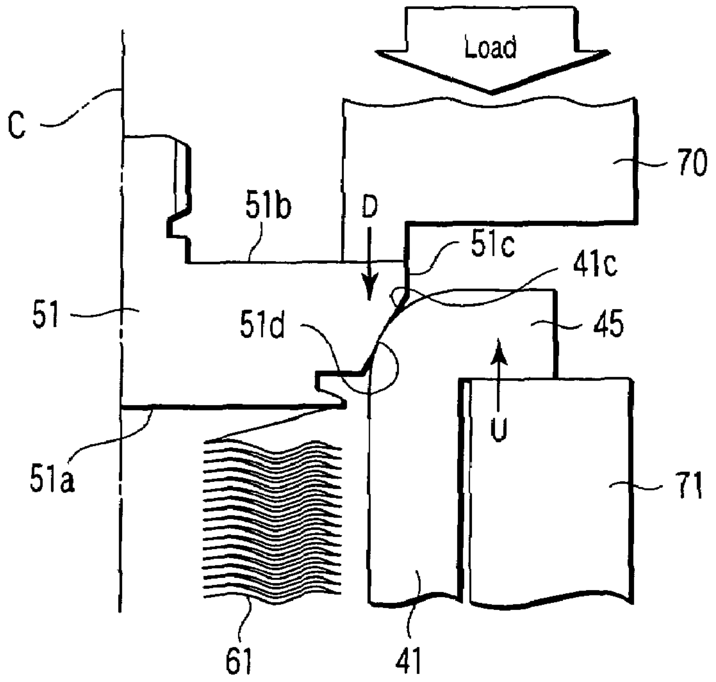
FIG. 2 is a longitudinal section typically illustrating a joint portion between a steel pipe and an end plate in the accumulator.

FIG. 1 is a longitudinal section illustrating an accumulator (pressure accumulating/buffer apparatus) 30 according to one embodiment of the present invention, and FIG. 2 is a longitudinal section typically illustrating a joint portion Q between a steel pipe 40 and an end plate 50 incorporated into the accumulator 30. G in FIG. 1 designates a gas chamber (air chamber), and L designates an oil chamber (liquid chamber).

The accumulator 30 has the steel pipe (contour member) 40 which has a cylindrical shape with a bottom, an end plate (cover body) 50 which is fitted into an opening of the steel pipe 40, and a bellows mechanism 60 housed in the steel pipe 40. The steel pipe 40 and the end plate 50 compose the pressure container, and a tapered surface 41*c*, mentioned later, of the steel pipe 40 and a tapered surface 51*d*, mentioned later, of the end plate 50 are jointed by resistance welding so that the joint portion Q is formed.

The steel pipe 40 is formed by joining a pipe portion 41 integrally with a bottom portion 42. The bottom portion 42 is formed with a through hole 42*a*. The through hole 42*a* is blocked airtightly by a gas sealing stopper 43. Further, a cover 44 is attached to an outer portion of the through hole 42*a*. 41*a* in FIG. 1 designates an inner wall surface of the pipe portion 41, 41*b* designates an outer wall surface, and 41*c* designates a tapered surface formed on the inner wall surface 41*a*. Further, an alternate long and two short dashes line 45 in FIG. 1 designates a flange portion which can be cut.

The end plate 50 has an end plate main body 51 formed into a disc shape, a port portion 52 which is provided to a center of the end plate main body 51 and has a through hole therein, and a cylindrical member (cylindrical body) 53 which is jointed to an upper surface 51*a*, mentioned later, of the end plate main body 51.

The end plate main body 51 is arranged so that the upper surface 51*a* is inside of the steel pipe 40 and the lower surface 51*b* is outside of the steel pipe 40. Further, a tapered surface 51*d* is formed from a side surface 51*c* to the upper surface 51*a*. The tapered surface 51*d* is provided with a ring-shaped part 54 made of rubber or resin, and it prevents sputter from entering the gas chamber G at the time of welding.

The bellows mechanism 60 has a metallic bellows 61 formed into a cylindrical shape, a bellows cap 62, a seal function member 63, and a guide 64. The bellows cap 62 has a disc shape and is mounted to one opening end of the metallic bellows 61. The seal function member 63 is mounted to a central concave portion 62*a* of the bellows cap 62 and is made of a rubber material. The guide 64 is mounted to an outer peripheral portion of the bellows cap 62. Further, since the guide 64 slides along an inner peripheral surface of the pipe portion 41, the bellows cap 62 can move smoothly.

The other opening end of the metallic bellows 61 is mounted airtightly to the upper surface 51*a* of the end plate main body 51. The seal function member 63 is arranged so that a lower surface 63*a* of the metallic bellows 61 in the most shrunk state touches an upper surface 53*a* of the cylindrical member 53.

In the accumulator 30 having such a constitution, when the pressure of pressure oil introduced into the oil chamber L via the through hole 52*a* of the port portion 52 exceeds gas pressure in the gas chamber G, the metallic bellows 61 expands so that the gas in the gas chamber G shrinks. On the other hand, when the pressure of the pressure oil in the oil chamber L is less than the gas pressure in the gas chamber G, the metallic bellows 61 shrinks so that the gas in the gas chamber G swells. A pressure fluctuation in the pressure oil in a hydraulic circuit is buffered by swell/shrink function of the gas in the gas chamber G, so that pulsation of the pressure oil is suppressed.

The steps of manufacturing the accumulator 30 are explained below. Firstly, the cylindrical member 53 is welded to the upper surface 51*a* of the end plate main body 51. After the metallic bellows 61 and the bellows cap 62 are welded, they are welded to the upper surface 51*a* to the end plate main body 51.

Figure 3:
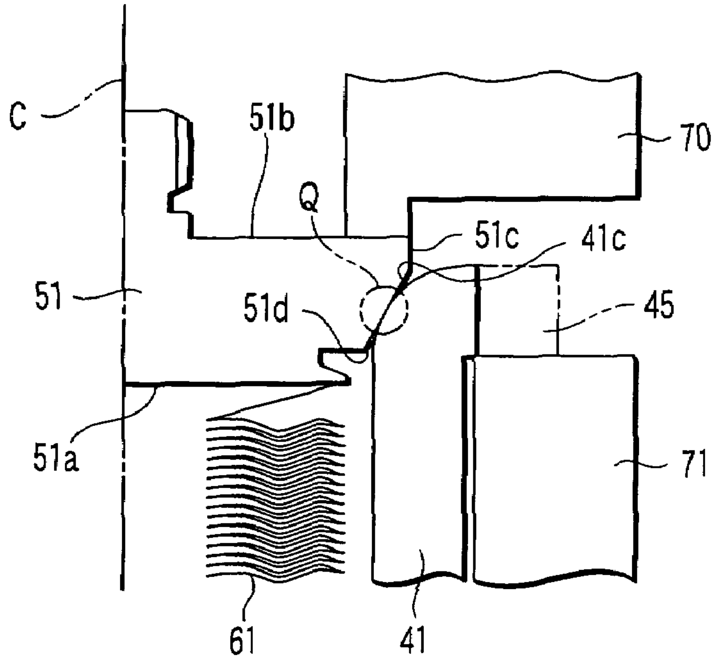
FIG. 3 is a longitudinal section typically illustrating the joint portion between the steel pipe and the end plate in the accumulator.

As shown in FIGS. 2 and 3, the end plate main body 51 and the steel pipe 41 are resistance-welded. That is to say, the tapered surface 41*c* of the pipe portion 41 is allowed to butt with the tapered surface 51*d* of the end plate man body 51. The lower surface 51*b* of the end plate main body 51 is pressed by a first electrode 70 of a resistance welding machine (not shown) to a direction of arrow D in FIG. 2, and the flange portion 45 of the pipe portion 41 is pressed by a second electrode 71 to a direction of arrow U in FIG. 2. It is desirable that the second electrode 71 has a ring shape. The use of the ring-shaped electrode can prevent unnecessary discharge to the flange portion 45. That is to say, the tapered surface 41*c* and the tapered surface 51*d* are pressurized. Electricity is turned on between the first electrode 70 and the second electrode 71, so that the resistance welding is carried out. As a result, the tapered surface 41*c* and the tapered surface 51*d* are melted so as to be welded, and the joint portion Q is formed. The flange portion 45 is cut as the need arises.

When the resistance welding is carried out, a foreign matter intrusion preventing cap K is attached to the port portion 52 so as to prevent foreign matter from intruding.

The resistance welding can be carried out satisfactorily by applying large welding load. The steel pipe 40 is, therefore, welded to the end plate 50 satisfactorily, and a sealed state of the pressure container becomes secure and firm.

According to the accumulator 30 in the embodiment, even in the case where a steel pipe with thickness of, for example, 2 mm or more is resistance-welded to a mirror plate by applying large welding current (for example, 300 kA or more), large welding load can be applied via the flange portion 45, so that uniform contact can be obtained. As a result, the pressure container having sufficient strength of the welded portion can be formed.

Further, since the electrodes do not have to be split into two and thus discharge to the members from the electrodes can be prevented, the surfaces of the members such as the steel pipe and the end plate do not get rough.

Figure 4:
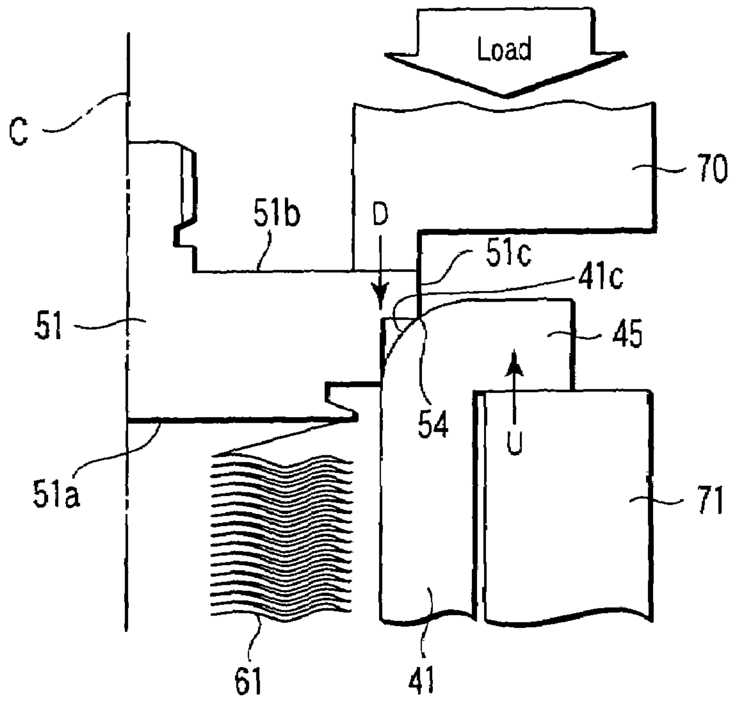
FIG. 4 is a vertical, sectional view of the end plate, which is deformed in a specific way in the accumulator.
Figure 5:
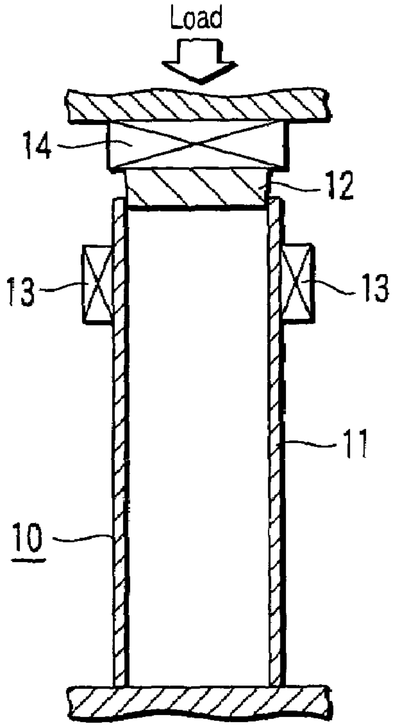
F I G. 5 PRIOR ART
FIG. 5 is a longitudinal section illustrating one example of a method of jointing a shell member and a cover body in a pressure container to be used in a conventional accumulator.
Figure 6:
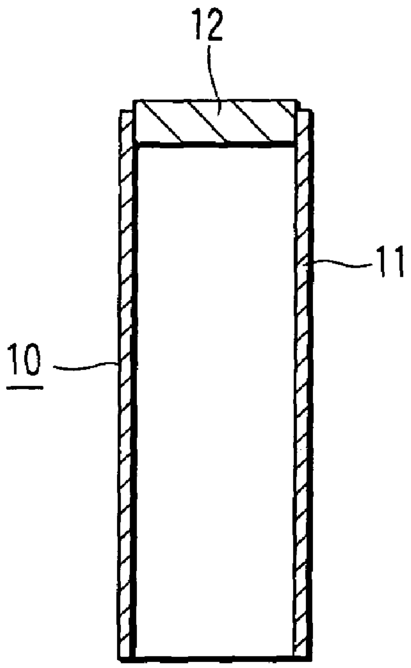
FIG.6 PRIOR ART
FIG. 6 is a longitudinal section illustrating the pressure container.
Figure 7:
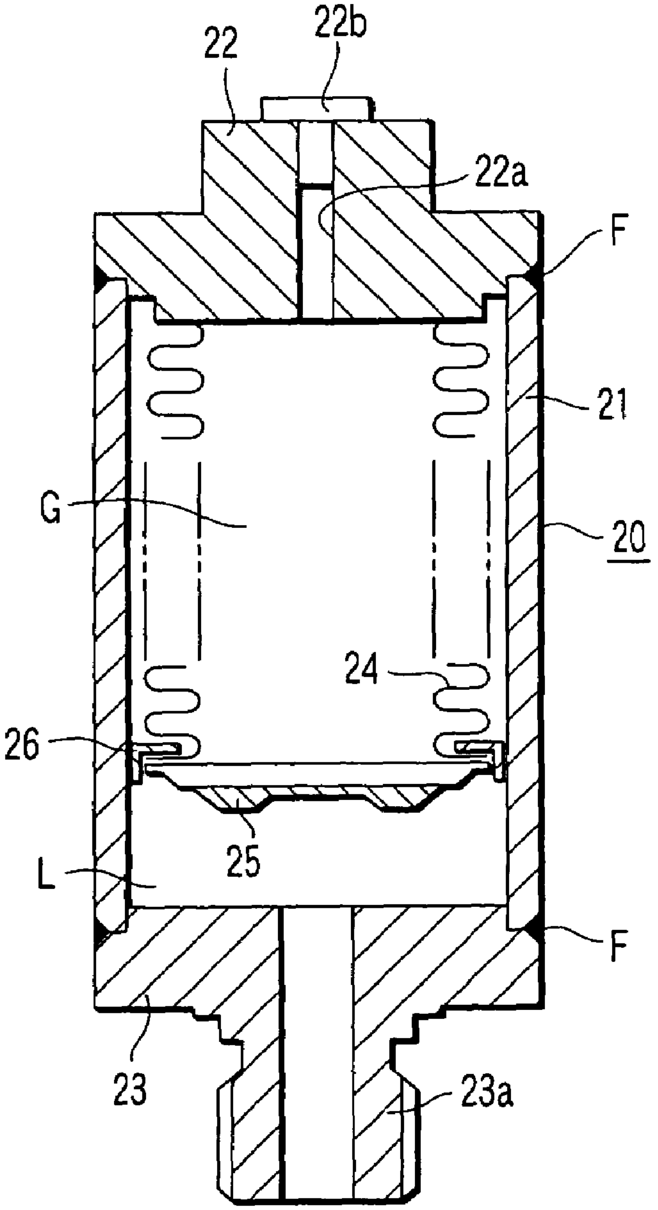
FIG.7 PRIOR ART
FIG. 7 is a longitudinal section illustrating a conventional accumulator.

In the embodiment described above, the end-plate main body 51 has a tapered surface 51*d*. Instead, the end-plate main body 51 may have an edge part 54 as shown in FIG. 4. The pipe portion 41 may have its tapered surface 41*c* abutting on the edge part 54. Thus, the same advantage can be attained as in the structure of FIG. 2.

The present invention is not limited to the above embodiment. For example, the above example explains the pressure container for the accumulator, but the present invention can be applied also to pressure containers to be used for applications of a gas spring and gas stay. Further, the pressure container where the end plate is provided to one side is explained, but it goes without saying that the present invention can be applied similarly to the case where the end plates are provided to both the ends, respectively. It goes without saying that the present invention can be carried out variously without departing from the scope of the gist.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pressure container comprising:

a cylindrical contour member having an opening end; and a cover body that blocks the opening end of the contour member, wherein the contour member comprises a flange portion, and the flange portion is adapted to be cut, and wherein the cover body comprises a joint portion that contacts an inner wall portion of the contour member in a vicinity of the flange portion, and the cover body is welded to the contour member at the joint portion.

2. The pressure container according to claim 1, wherein the flange portion is cut after the cover body is welded to the contour member at the joint portion.

3. The pressure container according to claim 1, wherein the joint portion of the cover body is tapered.

4. The pressure container according to claim 1, wherein the inner wall portion of the contour member contacted by the joint portion of the cover body is tapered.

5. A pressure accumulating/buffer apparatus comprising:

a pressure container; and a gas chamber and a liquid chamber provided in the pressure container, wherein the pressure container comprises:

a cylindrical contour member having an opening end; and a cover body that blocks the opening end of the contour member, wherein the contour member comprises a flange portion, and the flange portion is adapted to be cut, and wherein the cover body comprises a joint portion that contacts an inner wall portion of the contour member in a vicinity of the flange portion, and the cover body is welded to the contour member at the joint portion.

6. The pressure accumulating/buffer apparatus according to claim 5, wherein the gas chamber and the liquid chamber are partitioned by a metallic bellows formed along an inner wall surface of the pressure container.

7. The pressure accumulating/buffer apparatus according to claim 6, wherein a first opening end of the metallic bellows is welded airtightly to the cover body.

8. The pressure accumulating/buffer apparatus according to claim 5, wherein the joint portion of the cover body is tapered.

9. The pressure accumulating/buffer apparatus according to claim 5, wherein the inner wall portion of the contour member contacted by the joint portion of the cover body is tapered.

10. A pressure accumulating/buffer apparatus comprising:

a pressure container; and a gas chamber and a liquid chamber provided in the pressure container, wherein the pressure container comprises:

(i) a cylindrical contour member having an opening end;

(ii) a cover body that blocks the opening end of the contour member, wherein the contour member comprises a flange portion, and the flange portion is adapted to be cut, wherein the cover body comprises a joint portion that contacts an inner wall portion of the contour member in a vicinity of the flange portion, and the cover body is welded to the contour member at the joint portion, wherein the gas chamber and the liquid chamber are partitioned by a metallic bellows formed along an inner wall surface of the pressure container, and wherein a first opening end of the metallic bellows is welded airtightly to the cover body; and (iii) a cylinder body attached to an inner surface of the cover body so as to be coaxial with the cylindrical contour member, wherein a second opening end of the metallic bellows is covered with a bellows cap, and the bellows cap is provided with a seal function member which touches the cylinder body when the metallic bellows shrinks, and wherein the cover body is provided with a port which enables a liquid to flow into and out of the liquid chamber, which is defined by a space surrounded by the cover body, the bellows cap, the cylinder body and the metallic bellows.

* * * * *